June 4, 1935.  A. L. BAUSMAN  2,003,851
CONFECTION COATING MACHINE
Filed Oct. 23, 1933
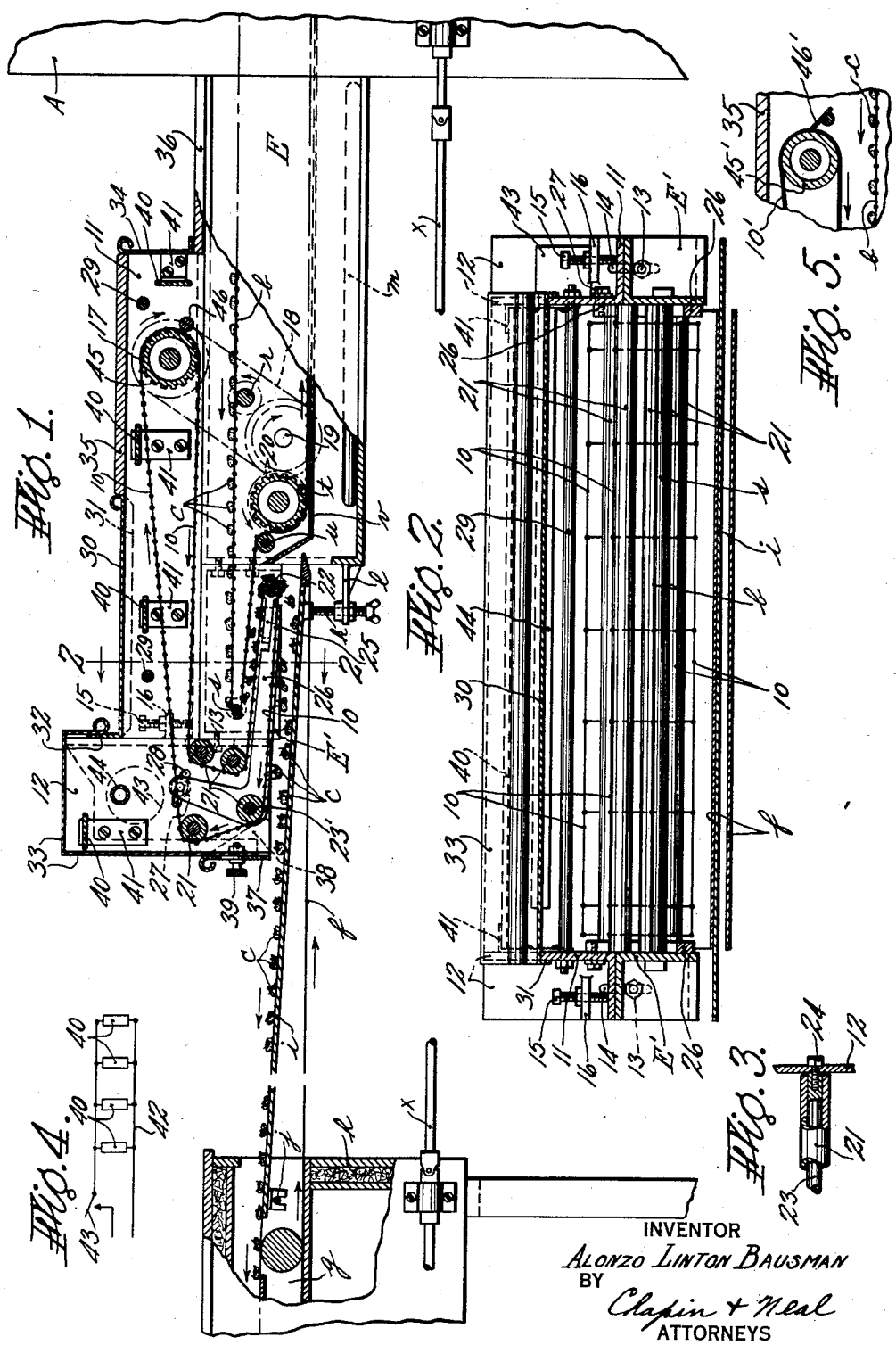
INVENTOR
ALONZO LINTON BAUSMAN
BY Chapin + Neal
ATTORNEYS Patented June 4, 1935

2,003,851

UNITED STATES PATENT OFFICE 2,003,851

CONFECTION COATING MACHINE

Alonzo Linton Bausman, Springfield, Mass.

Application October 23, 1933, Serial No. 694,783

12 Claims. (Cl. 91—3)

This invention relates to improvements in machines for coating confections and the like.

The invention is designed to do the same general work as either of the machines disclosed in my U. S. Letters Patent Nos. 1,571,365 and 1,813,655, granted February 2, 1926 and July 7, 1931, respectively. The machine of this invention, however, will perform such work in a better manner and affords a simpler, better and less expensive structure for the purpose and one which has found favor in the trade.

The machines of said patents function to coat confections in the usual way but differ from standard machines in the manner of transferring the coated confections from the machine to the delivery belts thereof. The characteristic difference is that the freshly coated confections are allowed to travel along with the coating machine conveyer beyond the normal point,—the end of its upper stretch of travel,—and are allowed to drop from said conveyer during the initial part of its lower stretch of travel, falling upon an underlying conveyer. This expedient is of general utility in the work of transferring coated confections of relatively small size, such as peanuts, raisins and the like, which are difficult to transfer in the normal manner, and it has special utility in the work of decorating any freshly coated confections, regardless of their size, which are susceptible to transfer in the manner described. The confections are decorated by strings which are drawn out from the viscous coatings of the confections as they fall from the conveyer, to which they tend to cling by reason of their viscous coatings.

One object of the invention is to provide an improved apparatus for performing work of the above described character without requiring relocation of the cold box or other means used to harden the coatings of the confections.

Another object of the invention is to provide such an apparatus in the nature of a comparatively simple and relatively inexpensive attachment, which can be applied to a confection coating machine of standard form without extensive changes in such machine to adapt the latter to perform work of the special character stated.

Another object of the invention is to provide an intermediate conveyer travelling in part in the space between the delivery end of the lower stretch of the coating machine conveyer and the receiving end of the upper stretch of the delivery conveyer and presenting in such travel an upper stretch, which underlies the lower stretch of the coating machine conveyer and travels in the same direction and at approximately the same speed thereof, and a lower stretch which overlies a portion of the upper stretch of the delivery conveyer and travels in the same direction and at approximately the same speed thereof.

Another object of the invention is to provide means for heating this transfer belt to prevent such chocolate as adheres thereto from hardening.

A further object of the invention is to provide means for removing from said belt any excess chocolate adhering thereto and, if desired, to remove substantially all such chocolate and keep said belt clean.

Other objects will appear as the detailed description proceeds and will be pointed out in the appended claims.

The invention will be disclosed with reference to the accompanying drawing, in which:

Fig. 1 is a fragmentary elevational view, partly in section, showing the delivery end of a confection coating machine with the improvements of this invention applied thereto;

Fig. 2 is a cross sectional view taken on the line 2—2 of Fig. 1;

Fig. 3 is a fragmentary sectional view illustrative of the detail of the mounting of certain of the rolls shown in Fig. 1;

Fig. 4 is a diagrammatical view illustrative of the automatic temperature control for the apparatus; and Fig. 5 is a fragmentary view, taken similarly to Fig. 1, showing a modification.

Referring to this drawing; A represents the casing of a suitable machine for coating confections with chocolate or the like and E is the so-called extension frame of such machine,—a trough-like structure open at the top, which houses in part the reticulated or wire mesh belt $b$ of the coating machine. The belt $b$ is usually the one on which the confections are carried while being coated and in any event it is one which carries the confections shortly after the coating operation and while their coatings are still plastic and workable. This belt is supported in its upper stretch of travel by suitable rolls, one of which is shown at $r$ and by very small end rolls, one of which is shown at $s$. It is driven in its lower stretch by a roll $t$, which is mounted in the upright walls of frame E and driven by the usual or any suitable means. A small roll $u$, also mounted in said walls, is located adjacent roll $t$, to direct the belt $b$, in the intial part of its lower stretch to travel in closely adjacent and nearly parallel relation with the upper stretch thereof. The delivery end of belt $b$ lies between two side frames E', bolted to and forming an extension of the member E, and roll $s$ is mounted in said frames in the usual or any suitable manner. A trough $v$ underlies in part the lower stretch of belt $b$, extending from roll $u$ to the right, to receive drippings of chocolate which are scraped back along the trough by belt $b$ and carried into the main casing A of the machine. The extreme delivery end of belt $b$, which lies between frames E' is exposed from below (Fig. 2) so that the coated confections, such as c, may drop from the belt b during the initial part of its lower stretch of travel and fall upon an underlying conveyer.

Heretofore, such underlying conveyer has been a delivery conveyer of impervious form, such as a belt of waxed paper or any other suitable material. In this case, the confections do not drop directly upon the delivery conveyer, shown at f, but are received on a conveyer 10 and transferred by such conveyer to the delivery conveyer f. This delivery conveyer may be of any usual or suitable form and mounted and driven in the usual or any suitable way. It may be relatively short and serve to convey the confections to a cold room or it may be relatively long and convey the confections through a cooling tunnel g contained in a cold box, such as that shown in part at h. The belt f in its travel from a position underlying belt b to the entrance of box h, passes over a table i which is pivotally supported at one end from a rod j mounted in box h and at its other end is supported from the coating machine in any suitable way so that its receiving end can be raised and lowered with respect to the overlying belt b. As shown, thumb screws k mounted in brackets l on the extensions E support the free end of table i and allow the same to be raised and lowered in a manner which will be clearly obvious from the drawing.

It should be noted that the machine A, except for the frames E', is or may be the standard coating machine and that the cold box, including delivery belt f and its table i are standard equipment. It should also be noted that the machine A and cold box h and belt f are disposed in the same relation as standard practice dictates, except that the receiving end of belt f has been lowered. Normally belt f has the receiving end of its upper stretch positioned in the same plane as and closely adjacent to the delivery end of belt b.

To adapt existing equipment to embody the present invention, the belt f is lowered so that its receiving end lies below belt b as shown, the extension frames E' are added and the course of belt b is altered by the rolls s and u to provide for a portion to overlie the receiving end of belt f. Then the transfer belt 10 and associated parts are applied as attachments to the standard equipment which is then adapted to perform all of the work of the specially constructed and therefore relatively expensive machine of the second named prior patent. It is not necessary, as in such patent, to reverse the direction of travel of the delivery belt and make it travel back through the coating machine, and to provide a specially constructed tunnel to insulate the belt f from the heat of the coating machine. Nor is it necessary to relocate existing equipment in any way, as by moving the cold box or other cooling provisions to the feed end of the coating machine. Existing equipment can be used without change in the relative location of parts, with the exception of the slight and relatively simple change described which is necessary to bring a portion of the delivery end of belt b into overlying relation with the belt f.

The attachments, forming the subject matter of this invention will next be described. A pair of side frames 11 are mounted, one on top of each side wall of the extension E, and suitably secured thereto. These frames also extend over frames E' and are suitably secured thereto,—the outer ends of frames 11 lying flush with the outer ends of frames E'. To the outer end of each of the frames E' is secured another side frame 12. A bolt 13, passing through a slot 14 in each side frame 12 and threaded into the side frame E', serves to secure these frames together in a manner enabling relative vertical adjustment. Such adjustment may conveniently be effected by screws 15 threaded into lugs 16, fixed one to each side frame 12 and having their lower ends bearing against the underlying frames 11. These frames 11 and 12 serve to support the rolls which carry the transfer belt 10. This belt 10 is completely housed in by the frames 11 and 12, and suitable covers applied thereto, except for one short stretch thereof which overlies belt f and from which the coated confections fall onto belt f.

The belt 10 is driven by a roll 17, the shaft of which is mounted at its ends in frames 11 and driven by a chain 18 and suitable sprockets from a shaft 19, mounted in one of the frames E. The shaft 19 is connected by gearing 20 to the shaft of drive roll t to be driven therefrom at the same surface speed but in the opposite direction. The belt 10 is trained over a series of idler rolls 21, all mounted in frames 12, and over an adjustable roll 22. The various rolls direct the belt 10 as follows;—from roll 17 to the left in a horizontal course above belt b to one roll 21, thence downwardly to an underlying roll 21 and thence to the right in a more or less horizontal course underlying belt b to the adjustable roll 22, thence to the left in a more or less horizontal course which overlies belt f to another roll 21, thence upwardly to the fourth roll 21 and thence to the right to and around the drive roll 17. It will be noted that the belt 10 in its horizontal course which immediately underlies the lower stretch of belt b, moves in the same direction and at the same speed as said stretch of belt b and that in its lowermost horizontal course, which immediately overlies belt f, it moves at the same speed and in the same direction as the upper stretch of belt f.

The rolls 21 may be mounted in frames 12 in any suitable way. One such way is shown in Fig. 3, from which it will be seen that the rolls are tubular and that each encompasses a rod 23 on which it turns. These rods are fixed at opposite ends to the frames 12, as by cap screws 24 or in any other suitable way.

The adjustable roll 22 is mounted at its ends in bearings 25 secured, preferably in a manner to enable longitudinal adjustment, one to each of a pair of bell crank levers 26. These levers are pivoted on the rod 23' which supports one of the rolls 21,—such roll being enough shorter than the others to accommodate the two levers. The upstanding arm of each lever 26 is secured by a bolt 27 to the adjacent side frame 12 which has an arcuate slot 28 therein to receive the bolt. This slot is curved concentrically with respect to rod 23' and enables the bell crank levers to be moved into various positions, whereby the roll 22 may be raised or lowered as desired.

The frames 11 are held together in proper laterally spaced relation in any suitable way, as by a series of tie rods 29. The roll supporting rods 23 serve also as tie rods for the frames 12.

The space between the pairs of side frames 11 and 12 may be enclosed in any suitable way. As shown, a series of easily removable covers is used for the purpose. Thus, a metal cover 30 is applied to the left hand end of frames 11 and has depending flanges 31 to engage the same as well as an upstanding flange 32 to abut the right hand ends of frames 12. A cover 33, roughly L-shaped in cross section and having flanges similar to 31 is slipped over the frames 12 to cover the left hand end, top and exposed right hand end, such cover overlapping the flange 32 and enabling the frames 12 to be moved up and down without breaking the enclosure. A vertical wall 34 is secured at its ends to the right hand vertical ends of the frames 11 and this wall terminates with a rolled over upper end. The right hand end of cover 30 is similarly formed and one of the covers 35, such as was formerly used to cover the extension E is placed between these rolled over ends, as shown. The exposed portions of extensions E are covered with the usual cover 36. The cover 33 is provided with an adjustable lower section 37 for the lower part of its right hand end. This section 36 overlaps the cover 33 in part and has deep side flanges 38 to overlap the side faces of frames 12. Section 37 is secured to cover 33 by a bolt 39 which passes through a slot 40 in the section and enables the latter to be projected below the frames 12, whenever necessary or desirable. This section is intended to be moved downwardly as closely as is feasible to the tops of the coated confections on belt $f$, to exclude as far as possible the entrance of cold air to the interior of the housing afforded by frames 11, 12 and E' and their described covers.

This housing is preferably provided with suitable heating means for use when required. There is a heating means, designated conventionally at $m$, in the extension section E and disposed beneath trough $v$. The casing A is also heated. The heat from member $m$ will to some extent rise and warm the belt 10 but in the cold seasons it has been found desirable to supplement the aforesaid means, as for example by a series of electric heating units 40, distributed throughout the housing in a manner best calculated to uniformly warm it. These units may be supported, as indicated, by angle irons 41 from frames 11 or 12 as the case may be. These units 40 may be connected in multiple in an electric circuit 42, as shown in Fig. 4, and controlled by a suitable switch 43. This switch, which may be of the mercury tube type, is preferably mounted outside frames 12, as shown in Figs 1 and 2, and actuated by a thermostatic element 44, located within the described housing and responsive to the temperature therein. In this manner, the temperature within the housing may be automatically maintained within close limits at any degree desired. I prefer to have the switch 43 adjusted to maintain the temperature somewhat above the dipping temperature of the chocolate. For example, if the chocolate used for coating is maintained at 90 degrees Fahr., the temperature in the housing may be maintained at or around 92 degrees Fahr.

The roll 17, used to drive belt 10, has a facing 45 of rubber, corrugated and circumferentially grooved to receive the cross wires and the longitudinal wires, respectively, of this belt. Adjacent this roll is a rod 46, suitably mounted at its ends in frames 11, and arranged to press against the belt 10 and the rubber facing 45 of roll 17 and keep the roll and belt 10 substantially clean of chocolate. The heat in the housing keeps such chocolate as clings to belt 10 in fluid condition so that much of it will drop off before reaching roll 17. However, such chocolate as is left on the belt will be squeezed out between roll 17 and rod 46 and flow over this rod, dropping down onto belt $b$ and passing through the same into trough $v$. In case some of the chocolate, thus falling or falling from belt 10 at other places, should lodge on some of the confections, it does no harm. It simply merges with the then plastic coatings of the confections and, if any confection bears an excess of coating, the excess will fall off.

The transfer belt 10 has been shown as of the same general construction as belt $b$. It may, however, be of nonforaminous form and of other material. For example, it may be of waxed paper or other suitable material, as indicated at 10' in part in Fig. 5. The belt 10' will of course be mounted in the same way as above described and driven in the same way except that a plain roll 45' will be substituted for roll 45. When such a belt is used, it is desirable to replace the rod 46 with a scraper such as 46', or some other suitable cleaning means. The wire mesh belt 10 has the advantage that it is somewhat easier to clean than a belt such as 10'. However, either form of belt will do the same general work and produce decorations on the confections. The kind of decorations produced varies according to the kind of belt used,—those produced by belt 10 usually having two or three strings with sharp points, while those produced by belt 10' usually have only a single string.

The confection coating machine may, for example, be of the same general type as that disclosed in my U. S. Letters Patent No. 1,323,948, granted December 2, 1919. The cold box may, for example, be of the same general type as that disclosed in my prior U. S. Letters Patent No. 1,667,765, granted May 1, 1928. The cold box belt $f$ may be driven from the coating machine A by connections exemplified in part herein by $x$, and in the manner shown in the last named patent. In lieu of the cold box with its refrigerating tunnel and the endless, waxed paper belt, I may use an apparatus such as shown in my prior U. S. Letters Patent No. 927,928, granted July 13, 1909.

In operation, confections such as $c$, coated with chocolate or the like in the usual or any suitable way, are carried on the upper stretch of the wire mesh belt $b$. The coating of the confections, which is still soft and plastic, clings to the belt and tends to retain the confections on the belt. Consequently, as the belt $b$ travels around the small end roll $s$ and enters its lower stretch of travel, the confections are carried with it for a time and hang upside down, being suspended from the belt by their viscous coatings. The confections tend to fall and the viscous coating resists this tendency. But the confections gradually move down away from belt $b$ and that part of the chocolate coating of each confection which holds it to the belt is drawn out into a string or strings. When these strings become sufficiently attenuated the confections drop and are received upon the underlying conveyer 10. The point in the lower stretch of travel of belt $b$ at which the confections will drop off, is variable and cannot be predetermined with exactness. Such point will vary with variations in the viscosity and temperature of the coating. Hence, the best scheme to use under these circumstances is to provide for the lower stretch of belt $b$ to move in overlying relation with the belt 10 and in the same direction and at the same speed through a path which is sufficiently long so that all the confections will under all usual conditions have dropped from the belt before they reach the end of such path. The drawing shows such an arrangement and, considering any one point on belt *b* at which a confection is attached, that confection will have dropped free from the belt before said point of the belt reaches roll *u*. It will be seen that the confections need not necessarily drop successively in order. The point in the travel of belt *b*, at which the confections drop, if within the prescribed range, is immaterial. There will always be a space on the underlying conveyer 10 to receive the confection when it drops from belt *b* no matter at what point in the aforesaid range of travel it drops. There is no chance for one confection to drop on top of another and the confections will be arranged on belt 10 in the same order in which they were arranged on belt *b*.

The confections carried by belt 10 travel with it around roll 22 and into that lower stretch of its travel which immediately overlies the upper stretch of the delivery conveyer. Here again, these two stretches move in the same direction and at the same speed for the same reasons and purposes as above set forth and the transfer of confections takes place in the same manner. In the act of dropping from belt 10, one or more strings of chocolate are drawn out from the coatings of the chocolate and finally break as above described. Those portions of the broken strings which remain attached to the confections form decorations on the upper sides thereof, as pointed out in the second named prior patent. When the confections drop from belt *b* upon belt 10, similar decorations are formed but these are usually later obliterated when the confections fall from belt 10 upon belt *f*. For example, those decorations formed in the upper face of the confections during their transfer from belt *b* to belt 10, will be found in the lower face of the confections at the time of their transfer to belt *f* and when they drop upon the latter belt all portions of the bottom coatings, including the decorations, are pressed out under the impact of the fall upon the smooth flat surface of belt *f* to form flat bottom surfaces for the confections.

Insofar as its function in the transferring and decoration of the confections is concerned, the belt 10 might simply extend between roll 22 and that roll 21 which is mounted on rod 23'. If this were done, there would be considerable difficulty in keeping belt 10 in condition to properly decorate the goods. This belt should be kept clean or at least protected against undue and uncontrolled accumulations of chocolate thereon. While it is not necessarily essential for all purposes that all the chocolate be removed from this belt, such chocolate as is on the belt should at least be maintained in plastic condition. With the belt arranged as suggested, it would be entirely located in the coolest area and subject to currents of cool air from the cold box *h*. Therefore, it would be more difficult to keep the belt at the temperature necessary to maintain the chocolate in plastic and workable state. If a scraper were provided for such a belt, as for example adjacent the said roll 21, then the chocolate removed by the scraper would tend to harden thereon and pile up into such a large mass as to interfere with the operation of the apparatus.

Because of the objections above stated, the belt 10 is made much longer and given an extended path of travel into a heated area. While one small portion of the belt is travelling in the aforesaid cool area at any one time, the remaining and by far the largest portion of the belt is located in a warm area. Considering any one point of belt 10, that portion is heated by its long time of exposure to the heating means to such an extent that it will not become unduly cooled during its short time of travel through the cooler area and chocolate adhering thereto will not be hardened. Then the excess chocolate on the belt will be squeezed out as the belt passes between roll 17 and rod 46. Of course, chocolate if present in relatively large quantities on belt 10, will drop off to a considerable extent during the uppermost stretch of travel of belt 10 and before reaching roll 17 because of the action of the heaters 40. Hence, the cleaning means 46 is chiefly useful in removing the smaller quantities of chocolate remaining on the belt. It is to be noted that the belt cleaning means are located in a heated casing so that the chocolate removed cannot pile up to any great extent, as it otherwise might, and as above described, if the chocolate removed were allowed to set. The location of the cleaning means is thus of great practical importance. As above set forth, the cleaning means may be a scraper, such as shown at 46' in Fig. 5 or any other suitable means may be used for the purpose. If a belt, such as 10' is used, the scraper would be relied on to do all the work of removing the chocolate therefrom. This does not necessarily mean that all the chocolate is removed from the belt, although that is the usual plan. The presence of chocolate on the belt, if more or less uniformly distributed and not localized in large masses, does no great harm provided it is maintained in plastic and easily workable condition. The scraper can therefore be used to distribute the chocolate evenly on the belt as well as to remove it.

It is to be noted that the invention provides a relatively small and simple mechanism which is adapted to be applied as an attachment to existing equipment to adapt that equipment either for the handling of small confections, such as raisins, peanuts and the like, or for decorating confections of any kind and size susceptible to being treated in the manner herein described. If larger confections are to be handled, the clearance between belts *b* and 10 will be increased by lowering frames 12 by the adjustments 15 and the clearance between belts 10 and *f* will be increased by lowering the table *i*, using the adjustments *k* for this purpose. The adjustment 27, 28 enables the belt 10 to be moved so that its upper stretch will parallel the central part of the lower stretch of belt *b* or so that its lower stretch will parallel the upper stretch of belt *f* and to various other adjacent positions. The height through which the confections fall, can be varied and the angularity between the adjacent stretches of belts 10 and *f* can be varied for the purposes set forth in the aforesaid Patent No. 1,813,655. But, unlike that patent, which shows a specially constructed machine and one which is relatively expensive, the present invention provides a device capable of being produced at relatively low cost and applied to existing equipment of usual form. The same standard equipment can be used part of the time for doing ordinary work and converted for the special work herein described, at any time by applying the attachment thereto. For doing this special class of work it is no longer necessary to have a special machine for the purpose and one of unusual construction. Nor is it necessary, to relocate the cold box or other cooling equipment in the unusual manner disclosed in the last named patent. The use of the intermediate transfer belt, such as 10 or 10', enables the invention of the last named patent to be practiced without a costly equipment specially provided for the purpose and without requiring any extensive changes in existing equipment of standard form.

The invention has been disclosed herein, in an embodiment at present preferred, for illustrative purposes but the scope of the invention is defined by the appended claims rather than by the foregoing description.

What I claim is:

1. In apparatus for the manufacture of coated confections, a pair of conveyers presenting upper stretches travelling in the same direction with the delivery end of one adjacent but above the receiving end of the other, an intermediate conveyer having a portion of its travel in the space between said ends and presenting in such portion of its travel upper and lower stretches which underlie and overlie respectively and move in the same respective directions as the lower stretch of the first conveyer and the upper stretch of the second conveyer, said conveyers carrying coated confections while their coatings are still workable and arranged for the transfer of confections from the lower stretch of the upper conveyer to the upper stretch of the underlying intermediate conveyer and from the lower stretch of the intermediate conveyer to the upper stretch of the lower conveyer, said intermediate conveyer having another portion of its travel wholly outside and remote from said space, and means for cleaning said intermediate conveyer in the last named portion of its travel.

2. In apparatus for the manufacture of coated confections, a pair of conveyers presenting upper stretches travelling in the same direction with the delivery end of one adjacent but above the receiving end of the other, an intermediate conveyer having a portion of its travel in the space between said ends and presenting in such portion of its travel upper and lower stretches which underlie and overlie respectively and move in the same respective directions as the lower stretch of the first conveyer and the upper stretch of the second conveyer, said conveyers carrying coated confections while their coatings are still workable and arranged for the transfer of confections from the lower stretch of the upper conveyer to the upper stretch of the underlying intermediate conveyer and from the lower stretch of the intermediate conveyer to the upper stretch of the lower conveyer, said intermediate conveyer having another portion of its travel wholly outside and remote from said space, and means for heating said intermediate conveyer in the last named portion of its travel to prevent the coating from freezing thereto.

3. In apparatus for the manufacture of coated confections, a pair of conveyers presenting upper stretches travelling in the same direction with the delivery end of one adjacent but above the receiving end of the other, an intermediate conveyer having a portion of its travel in the space between said ends and presenting in such portion of its travel upper and lower stretches which underlie and overlie respectively and move in the same respective directions as the lower stretch of the first conveyer and the upper stretch of the second conveyer, said conveyers carrying coated confections while their coatings are still workable and arranged for the transfer of confections from the lower stretch of the upper conveyer to the upper stretch of the underlying intermediate conveyer and from the lower stretch of the intermediate conveyer to the upper stretch of the lower conveyer, a casing through which another portion of said intermediate conveyer travels, and means for heating said casing.

4. In apparatus for the manufacture of coated confections, a pair of conveyers presenting upper stretches travelling in the same direction with the delivery end of one adjacent but above the receiving end of the other, an intermediate conveyer having a portion of its travel in the space between said ends and presenting in such portion of its travel upper and lower stretches which underlie and overlie respectively and move in the same respective directions as the lower stretch of the first conveyer and the upper stretch of the second conveyer, said conveyers carrying coated confections while their coatings are still workable and arranged for the transfer of confections from the lower stretch of the upper conveyer to the upper stretch of the underlying intermediate conveyer and from the lower stretch of the intermediate conveyer to the upper stretch of the lower conveyer, a casing through which another portion of said intermediate conveyer travels, means for heating said casing, and means for controlling said heating means and maintaining in said casing a predetermined temperature above the melting point of the coating of the confections.

5. In apparatus for the manufacture of coated confections, a pair of conveyers presenting upper stretches travelling in the same direction with the delivery end of one adjacent but above the receiving end of the other, an intermediate conveyer having a portion of its travel in the space between said ends and presenting in such portion of its travel upper and lower stretches which underlie and overlie respectively and move in the same respective directions as the lower stretch of the first conveyer and the upper stretch of the second conveyer, said conveyers carrying coated confections while their coatings are still workable and arranged for the transfer of confections from the lower stretch of the upper conveyer to the upper stretch of the underlying intermediate conveyer and from the lower stretch of the intermediate conveyer to the upper stretch of the lower conveyer, said intermediate conveyer having a course of travel above the upper conveyer, and means acting on said conveyer during said course of travel to remove coating material therefrom.

6. In a confection coating machine, a foraminous conveyer for carrying freshly coated confections, a transfer conveyer mounted to travel at substantially the same speed as the first conveyer and in part above the upper stretch of the first conveyer and in part below the lower stretch thereof, said transfer conveyer presenting an upper stretch moving in the same direction as and in underlying relation with the lower stretch of the first conveyer to receive coated confections dropping from the latter and a lower stretch moving in an opposite direction and from which the confections hang suspended by their plastic coatings, a receiving conveyer underlying said lower stretch and moving in the same direction and at substantially the same speed to receive confections dropping from the intermediate conveyer, and means for removing confection coating material from the transfer conveyer during its travel above the foraminous conveyer and at a point where the material removed will fall through the foraminous conveyer and into the coating machine.

7. In a confection coating machine, a foraminous conveyer for carrying freshly coated confections, a transfer conveyer mounted to travel at substantially the same speed as the first conveyer and in part above the upper stretch of the first conveyer and in part below the lower stretch thereof, said transfer conveyer presenting an upper stretch moving in the same direction as and in underlying relation with the lower stretch of the first conveyer to receive coated confections dropping from the latter and a lower stretch moving in an opposite direction and from which the confections hang suspended by their plastic coatings, a receiving conveyer underlying said lower stretch and moving in the same direction and at substantially the same speed to receive confections dropping from the intermediate conveyer, and means for heating the transfer conveyer during its travel above the foraminous conveyer.

8. In combination with a confection coating machine having a conveyer for carrying the freshly coated confections and a pair of side frames between which the delivery end of said conveyer travels, of a casing mounted on said frames and including a vertically adjustable section, a transfer conveyer mounted in said casing and having a portion of its travel extending below and in overlapping relation with the delivery end of the first conveyer and presenting upper and lower substantially horizontal stretches, said upper stretch moving in the same direction as the lower stretch of the first conveyer, a delivery conveyer having its upper stretch of travel in partially underlying relation with the lower stretch of the transfer conveyer and moving in the same direction, means for raising and lowering said section to vary the space between the adjacent stretches of the first and second conveyers, and means for raising and lowering said delivery conveyer to vary the space between the adjacent stretches of the transfer and delivery conveyers.

9. In combination with a confection coating machine having a conveyer for carrying the freshly coated confections and a pair of side frames between which the delivery end of said conveyer travels, of a casing mounted on said frames and including a vertically adjustable section, radius arms pivoted to said casing and projecting outwardly therefrom beneath the delivery end of the first conveyer, means for securing said arms to said casing in various positions of adjustment, a roll carried by the outer ends of said arms, a transfer conveyer mounted in said casing and having a portion of its travel extending below and in overlapping relation with the delivery end of the first conveyer and trained over said roll, said transfer conveyer presenting upper and lower substantially horizontal stretches, said upper stretch moving in the same direction as the lower stretch of the first conveyer, a delivery conveyer having its upper stretch of travel in partially underlying relation with the lower stretch of the transfer conveyer and moving in the same direction, means for raising and lowering said section to vary the space between the adjacent stretches of the first and second conveyers, and means for raising and lowering said delivery conveyer to vary the space between the adjacent stretches of the transfer and delivery conveyers.

10. In combination with a confection coating machine having a conveyer for carrying the freshly coated confections and a pair of side frames between which the delivery end of said conveyer travels, of a casing mounted on said frames, radius arms pivoted to said casing and projecting outwardly therefrom beneath the delivery end of the first conveyer, means for securing said arms to said casing in various positions of adjustment, a roll carried by the outer ends of said arms, a transfer conveyer mounted in said casing and having a portion of its travel extending below and in overlapping relation with the delivery end of the first conveyer and presenting upper and lower substantially horizontal stretches, said upper stretch moving in the same direction as the lower stretch of the first conveyer, a delivery conveyer having its upper stretch of travel in partially underlying relation with the lower stretch of the transfer conveyer and moving in the same direction, and means for raising and lowering said section to vary the space between the adjacent stretches of the first and last named conveyers.

11. In combination with a confection coating machine having a conveyer for carrying the freshly coated confections and a pair of side frames between which the delivery end of said conveyer travels, of a casing mounted on said frames and including a vertically adjustable section, a transfer conveyer mounted in said casing and having a portion of its travel extending below and in overlapping relation with the delivery end of the first conveyer and presenting upper and lower substantially horizontal stretches of which the upper stretch moves in the same direction as the lower stretch of the first conveyer, a delivery conveyer having its upper stretch of travel in partially underlying relation with the lower stretch of the transfer conveyer and moving in the same direction, and means for raising and lowering said section to adjust said stretches of the transfer conveyer with relation to the adjacent stretches of the first and third conveyers.

12. In an apparatus for making coated confections, first and second conveyers presenting upper stretches traveling in the same direction with the delivery end of the first adjacent but above the receiving end of the second, and a third conveyer mounted to travel in part above the upper stretch of the first conveyer and in part in the space between the lower stretch of the first and the upper stretch of the second conveyer and having its upper stretch moving in the same direction as the lower stretch of the first conveyer and its lower stretch moving in the same direction as the upper stretch of the second conveyer, whereby freshly coated confections carried by the first conveyer drop from the lower stretch thereof onto the upper stretch of the third conveyer and from the lower stretch of the third conveyer to the upper stretch of the second conveyer, and means acting on the third conveyer while traveling above the first conveyer to prevent the accumulation of coating thereon.

ALONZO LINTON BAUSMAN.